(12) United States Patent
Matsushita et al.

(10) Patent No.: US 10,128,651 B2
(45) Date of Patent: Nov. 13, 2018

(54) INRUSH CURRENT INHIBITING CIRCUIT INCLUDING A CONTROL PART THAT CONTROLS A SWITCHING ELEMENT

(71) Applicant: Yazaki Corporation, Minato-ku, Tokyo (JP)

(72) Inventors: Yoshinori Matsushita, Susono (JP); Osamu Kimura, Susono (JP)

(73) Assignee: YAZAKI CORPORATION, Tokyo (JP)

( * ) Notice: Subject to any disclaimer, the term of this patent is extended or adjusted under 35 U.S.C. 154(b) by 227 days.

(21) Appl. No.: 15/014,474

(22) Filed: Feb. 3, 2016

(65) Prior Publication Data
US 2016/0226238 A1   Aug. 4, 2016

(30) Foreign Application Priority Data
Feb. 4, 2015 (JP) ................... 2015-019892

(51) Int. Cl.
*H02H 3/087* (2006.01)
*H02H 9/00* (2006.01)
(Continued)

(52) U.S. Cl.
CPC ............ *H02H 9/001* (2013.01); *H02H 9/025* (2013.01); *H02J 1/00* (2013.01)

(58) Field of Classification Search
CPC .......... H02H 9/001; H02H 9/025; H02H 1/00; H02H 3/207; H02H 3/202; H02H 3/20;
(Continued)

(56) References Cited

U.S. PATENT DOCUMENTS 6,307,360 B1 * 10/2001 Kajiwara ................ H02M 1/32
                                                                323/282
7,035,071 B1 *  4/2006 Tiew ...................... H02M 3/157
                                                                361/93.9
(Continued)

FOREIGN PATENT DOCUMENTS

DE         4310748 A1 * 10/1994 ............... H02H 9/02
JP         2-131322 A      5/1990
(Continued)

OTHER PUBLICATIONS

Office Action dated Jun. 27, 2017 by the Japan Patent Office in counterpart Japanese Patent Application No. 2015-019892.
(Continued)

*Primary Examiner* — Thienvu Tran
*Assistant Examiner* — Nicolas Bellido
(74) *Attorney, Agent, or Firm* — Sughrue Mion, PLLC

(57) ABSTRACT

An inrush current inhibiting circuit is to inhibit an inrush current flowing to a load which includes an input capacitor and a pair of output terminals. The inrush current inhibiting circuit is provided with a switching element connected to the power source and on-off controlled, a first inductor connected between the switching element and a connecting point between the one output terminal and one electrode of the input capacitor, a diode whose cathode is connected to a connecting point between the switching element and the first inductor, a second inductor connected between an anode of the diode and a connecting point between the other electrode of the input capacitor and the other output terminal, and a control part for controlling the switching element.

2 Claims, 5 Drawing Sheets

(51) Int. Cl.
*H02H 9/02* (2006.01)
*H02J 1/00* (2006.01)

(58) Field of Classification Search
CPC . G02B 23/2438; G02B 15/173; H02J 7/0031; H02J 1/00; G06F 1/28; G05F 1/569; G05F 1/613; H01L 27/0251; H01L 27/0266; H03K 17/0822; H03K 19/00315; H03K 17/0826; H03K 17/18; H02M 1/32; H02M 3/1588; H02M 2001/0009; H02M 1/36; Y02B 70/1466
See application file for complete search history.

(56) References Cited

U.S. PATENT DOCUMENTS

| | | | |
|---|---|---|---|
| 7,522,398 B2* | 4/2009 | Tang | H02M 1/32 |
| | | | 361/93.9 |
| 2006/0037461 A1 | 2/2006 | Yasumura | |
| 2007/0008748 A1 | 1/2007 | Tang | |
| 2009/0096289 A1* | 4/2009 | Briere | H01L 23/50 |
| | | | 307/31 |
| 2010/0109617 A1* | 5/2010 | Erdl | H02H 9/001 |
| | | | 323/222 |
| 2014/0009134 A1* | 1/2014 | Bernardon | H02M 1/36 |
| | | | 323/284 |
| 2016/0124447 A1* | 5/2016 | Kobayashi | G05F 1/575 |
| | | | 323/280 |
| 2016/0336739 A1 | 11/2016 | Matsushita et al. | |

FOREIGN PATENT DOCUMENTS

| | | | |
|---|---|---|---|
| JP | 02131322 A | * | 5/1990 |
| JP | 8-275383 A | | 10/1996 |
| JP | 11-178332 A | | 7/1999 |
| JP | 11-178342 A | | 7/1999 |
| JP | 2000-245141 A | | 9/2000 |
| JP | 2002-209330 A | | 7/2002 |
| JP | 2005-94980 A | | 4/2005 |
| JP | 2009-247092 A | | 10/2009 |
| JP | 2012-90363 A | | 5/2012 |
| JP | 2015-154656 A | | 8/2015 |

OTHER PUBLICATIONS

Communication dated Oct. 3, 2017, from the Japanese Patent Office in counterpart application No. 2015-019892.

* cited by examiner

INRUSH CURRENT INHIBITING CIRCUIT INCLUDING A CONTROL PART THAT CONTROLS A SWITCHING ELEMENT

CROSS REFERENCE TO RELATED APPLICATIONS

This application claims priority from Japanese Patent Application No. 2015-019892 filed on Feb. 4, 2015, the entire contents of which are incorporated herein by reference.

BACKGROUND

Field of the Invention

The present invention relates to an inrush current inhibiting circuit.

Description of Related Art

In the case of turning on a power source of an apparatus (load), a large-capacity current (inrush current) exceeding a steady current may flow from the power source to the load. Since the inrush current may adversely affect each place of the apparatus, an inrush current inhibiting circuit for inhibiting the inrush current is known.

For example, Patent Reference 1 discloses an inrush current inhibiting circuit using a principle of a step-down chopper circuit. This inrush current inhibiting circuit is a circuit for outputting electric power from a pair of output terminals to a load using a DC power source as an input. The inrush current inhibiting circuit includes a series circuit of a coil and an FET between a positive electrode of the DC power source and one output terminal. The other output terminal is connected to a ground of the DC power source, and a reflux diode is connected in inverse-parallel with the coil. Also, a capacitor is formed between one output terminal and the ground of the DC power source.

In this inrush current inhibiting circuit, a control voltage is outputted from a driving circuit to a gate of the FET according to a high-frequency pulse signal, and switching operation of the FET is performed according to this control voltage. When an input voltage switched by the FET is applied to the coil, a current flows through the FET for only an on period (conduction period) of the FET, and the capacitor is charged. For a non-conduction period of the FET, charging of the capacitor is stopped and a current of the coil is decreased while circulating through the coil and the diode. The capacitor is charged every high-frequency pulse signal through such a cycle. In this case, a peak value of the charging current becomes small gradually and becomes zero at the completion of charging of the capacitor.

Patent Reference 1 JP-A-8-275383

According to a related art, a technique disclosed in Patent Reference 1 uses a coil as an inductor. In an apparatus using a large current, a large-diameter electric wire is used and the coil must be wound by an electric wire, with the result that there is a problem of upsizing a circuit. Also, in the case of a large-diameter electric wire, winding work of the coil requires time and effort, with the result that there is a problem of complicating work of manufacture.

Also, in an inrush current inhibiting circuit, withstand power characteristics of a switching element are selected on the premise of a peak current value of an inhibited inrush current. In the case of using a switching element with a large power capacity, a peak of the inhibited inrush current can be permitted sufficiently. On the other hand, since a current value when the inrush current attenuates is sufficiently smaller than the peak current value, a large difference is caused between both of the current values. As a result, there is a problem that the power capacity of the switching element cannot be utilized sufficiently.

SUMMARY

According to one or more embodiments, an inrush current inhibiting circuit is capable of properly inhibiting an inrush current while sufficiently utilizing a power capacity of a switching element.

One or more embodiments provide an inrush current inhibiting circuit for inhibiting an inrush current flowing to a load which includes an input capacitor and a pair of output terminals. The inrush current inhibiting circuit is provided with a switching element connected to the power source and on-off controlled, a first inductor connected between the switching element and a connecting point between the one output terminal and one electrode of the input capacitor, a diode whose cathode is connected to a connecting point between the switching element and the first inductor, a second inductor connected between an anode of the diode and a connecting point between the other electrode of the input capacitor and the other output terminal, and a control part for controlling the switching element. The pair of output terminals is connected to a power source. The pair of output terminals is connected in parallel with the input capacitor and outputs an input current from the power source. Each of the first inductor and the second inductor is constructed of an annular magnetic substance having a predetermined length along an axial direction so as to cover a periphery of an electric wire which is a current path. The control part controls the switching element so as to decrease a difference between electric power applied to the switching element when the inrush current occurs and electric power applied to the switching element when the inrush current attenuates.

In the inrush current inhibiting circuit of one or more embodiments, the control part may control the switching element according to a predetermined switching period, and a subsequent current may be monitored when the switching element is turned on, and the switching element may be turned off until the next switching period when the current reaches a preset limit value.

In the inrush current inhibiting circuit of one or more embodiments, the control part may perform the on-off control of the switching element by comparing a voltage of a carrier varying periodically with an end-to-end voltage of the input capacitor.

According to one or more embodiments, a large difference can be inhibited from being caused between the electric power applied to the switching element when the inrush current occurs and the electric power applied to the switching element when the inrush current attenuates. As a result, the inrush current can be inhibited properly while effectively utilizing a power capacity of the switching element.

DETAILED DESCRIPTION

First Embodiment

Figure 1:
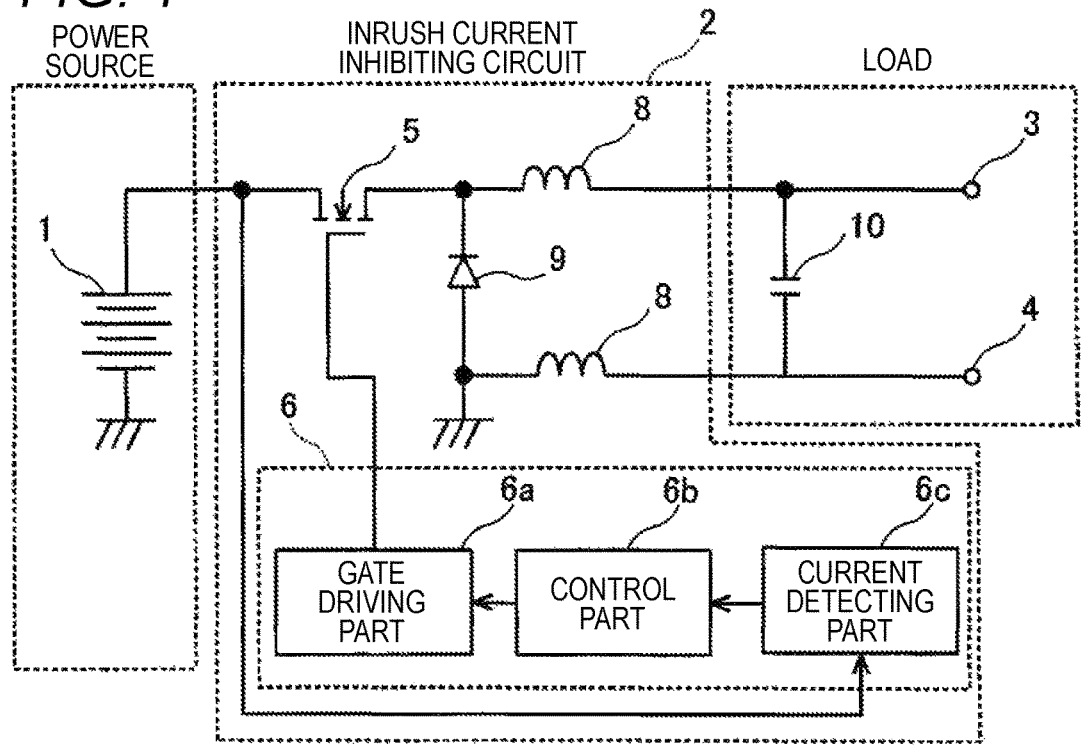
FIG. 1 is a circuit diagram conceptually showing a configuration of an inrush current inhibiting circuit according to a first embodiment.

FIG. 1 is a circuit diagram showing a configuration of an inrush current inhibiting circuit 2 according to the present embodiment. The inrush current inhibiting circuit 2 according to the embodiment is a circuit for outputting electric power to a load using a DC power source 1 as an input, and inhibits an inrush current flowing from the DC power source 1 (for example, a battery) to the load. The inrush current inhibiting circuit 2 mainly includes an FET 5, a control unit 6, first and second inductors 8, and a reflux diode 9.

Also, the load includes an input capacitor 10 and a pair of output terminals 3, 4, and, for example, an inverter applies to the load.

The input capacitor 10 is connected to the DC power source 1 through the inrush current inhibiting circuit 2, and is positioned in the input side of the pair of output terminals 3, 4.

The pair of output terminals 3, 4 is connected in parallel with the input capacitor 10, and outputs an input current from the DC power source 1. A load element (not shown) is connected between these output terminals 3, 4. One output terminal 3 corresponds to the positive electrode side of the DC power source 1, and the other output terminal 4 corresponds to the ground side of the DC power source 1.

The FET 5 is a switching element connected to the DC power source 1, and on-off control of the switching element is performed. Concretely, a drain of the FET 5 is connected to the positive electrode side of the DC power source 1, and a source of the FET 5 is connected to one output terminal 3 through the first inductor 8. Also, a gate of the FET 5 is connected to the control unit 6. When a gate signal is inputted to the gate of the FET 5, the FET 5 is turned on (conduction) and also, when the gate signal is not inputted to the gate of the FET 5, the FET 5 is turned off (non-conduction). In addition, as the switching element, switching elements other than the FET (field effect transistor) can be used.

The control unit 6 is a unit for controlling the inrush current inhibiting circuit 2, and includes a gate driving part 6a, a control part 6b, and a current detecting part 6c. The gate driving part 6a is controlled by the control part 6b, and outputs a gate signal to the gate of the FET 5. When the gate signal is inputted from the gate driving part 6a, a predetermined control voltage is applied to the gate of the FET 5, and the FET 5 is turned on. The control part 6b controls the gate driving part 6a based on a current value detected by the current detecting part 6c. The current detecting part 6c is means for detecting a current (inrush current) flowing from the DC power source 1 to the load, concretely, the current flowing through the FET 5. The details of a method for controlling the inrush current inhibiting circuit 2 by the control unit 6 will be described below.

The first inductor 8 is formed on the positive electrode side of the DC power source 1. Concretely, the first inductor 8 is connected between the source of the FET 5 and a connecting point between one output terminal 3 and one electrode of the input capacitor 10. Also, the second inductor 8 is formed on the ground side of the DC power source 1, and is connected between an anode of the reflux diode 9 and a connecting point between the other output terminal 4 and the other electrode of the input capacitor 10. Inductance values of the first and second inductors 8 are set at the same value.

A cathode of the reflux diode 9 is connected to a connecting point between the FET 5 and the first inductor 8. The anode of this reflux diode 9 is connected to the side opposite to the connecting point between the other output terminal 4 and the other electrode of the input capacitor 10 when viewed from the second inductor 8.

Figure 2:
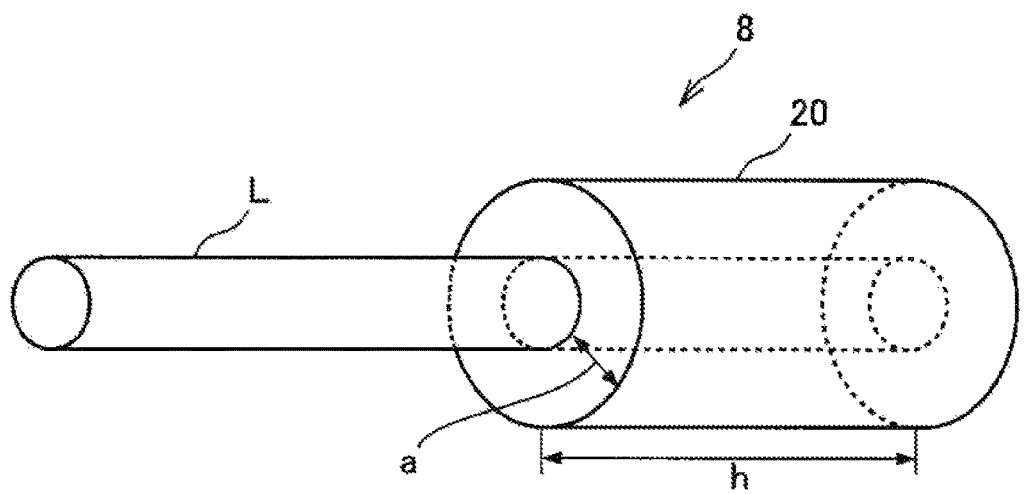
FIG. 2 is an explanatory diagram schematically showing a configuration of first and second inductors.

FIG. 2 is an explanatory diagram schematically showing a configuration of the first and second inductors 8. In the embodiment, the first and second inductors 8 (hereinafter both are collectively called the "inductors 8") are constructed of magnetic substances 20. This magnetic substance 20 is an annular member having a certain length in an axial direction, and is molded of a magnetic material. In the magnetic substance 20, a radial length of the annular portion, that is, the length from an inside diameter part inscribed in an electric wire L to an outside diameter is "a", and an axial length is "h". The electric wire L which is a current path is inserted into the inside diameter portion of this magnetic substance 20, and the inductor 8 is configured to cover the periphery of the electric wire L with the magnetic substance 20.

Selection of the magnetic material used as the magnetic substance 20 depends on a current passed through the electric wire L. For example, in the case of passing a large current (up to about 300 A), the magnetic material with a high saturation magnetic flux density such as permendur or electromagnetic soft iron is preferably selected.

Figure 3A:
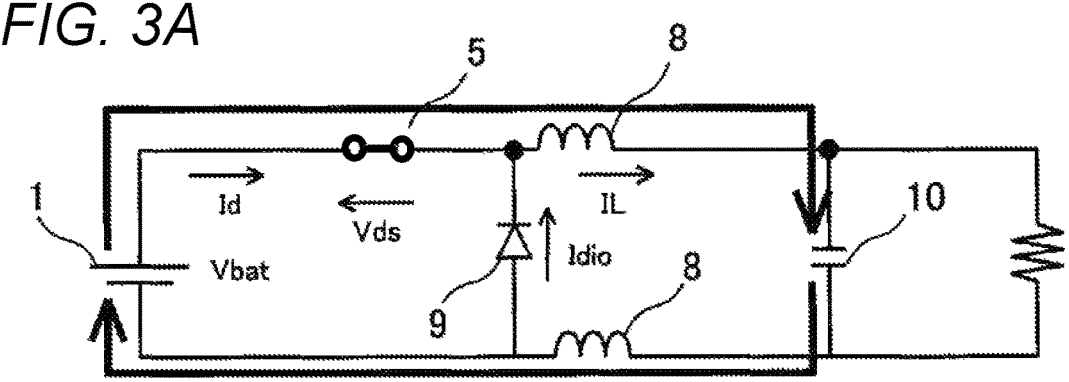
FIGS. 3A and 3B are explanatory diagrams schematically showing an operating principle of the inrush current inhibiting circuit.
Figure 3B:
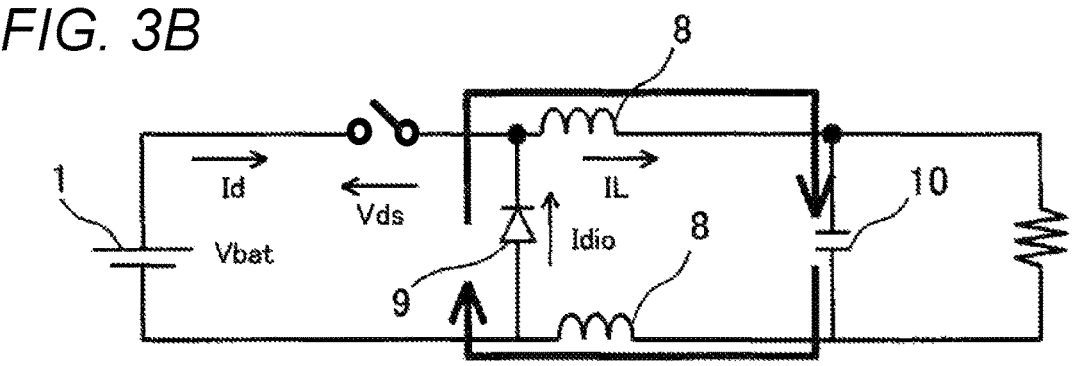
Figure 4A:
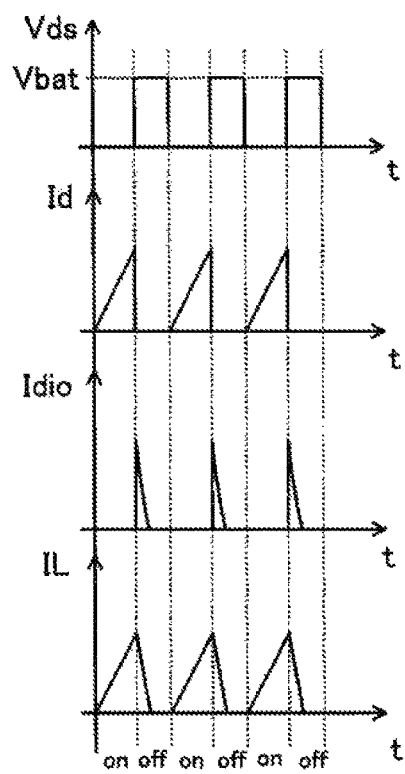
FIGS. 4A and 4B are explanatory diagrams showing transition of a current waveform and a voltage waveform.
Figure 4B:
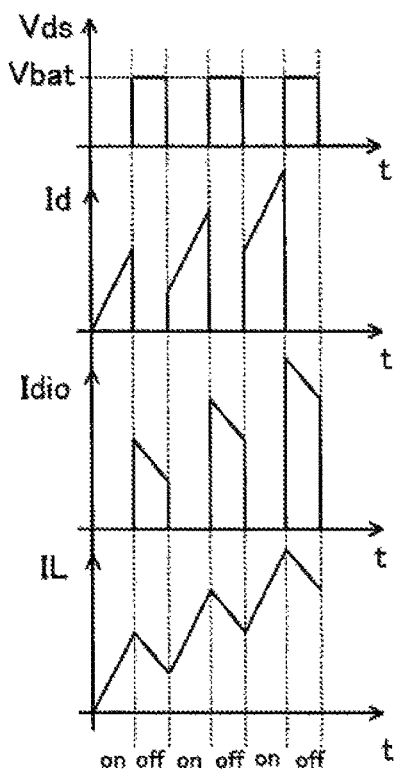

FIGS. 3A and 3B are explanatory diagrams schematically showing an operating principle of the inrush current inhibiting circuit 2 according to the embodiment, and FIG. 3A shows a state in which the FET 5 is turned on, and FIG. 3B shows a state in which the FET 5 is turned off. FIGS. 4A and 4B are explanatory diagrams showing transition of a current waveform and a voltage waveform of each part, and FIG. 4A shows a current discontinuous mode in which an inductor current becomes discontinuous, and FIG. 4B shows a current continuous mode in which the inductor current becomes continuous.

First, consider that on-off control of the FET 5 is performed at a predetermined switching frequency and a predetermined duty ratio as operation of the inrush current inhibiting circuit 2. When the FET 5 is turned on, a voltage (0 V in FIGS. 4A and 4B) by a voltage drop according to on resistance of the FET 5 is applied between the drain and the source of the FET 5. In FIGS. 4A and 4B, "Vds" is a voltage between the drain and the source. On the other hand, when the FET 5 is turned off, a power source voltage Vbat is applied between the drain and the source of the FET 5.

When the FET 5 is turned on, the input capacitor 10 is charged, with the result that a large current tends to flow in a drain current Id. However, the drain current Id is increased at a certain slope as shown in FIGS. 4A and 4Bb by a back electromotive voltage of the inductors 8. This slope depends on the inductance values of the inductors 8. Also, a peak value of the current can be controlled by on time or the inductance values. When the FET 5 is turned off, the drain current Id does not flow.

When the FET 5 is turned on, a diode current Idio does not flow. On the other hand, when the FET 5 is turned off, the inductors 8 continue to pass the current, with the result that the current flows in a path shown in FIG. 3B. However, since the current is not supplied from the DC power source 1, this current is gradually decreased at a certain slope. This slope depends on the inductance values of the inductors 8. Also, by changing this slope or off time, an operation mode can be switched to the current continuous mode (FIG. 4A) or the current discontinuous mode (FIG. 4B).

When the FET 5 is turned on, the drain current Id flows in an inductor current IL. On the other hand, when the FET 5 is turned off, the diode current Idio flows in the inductor current IL. In the current discontinuous mode, as the input capacitor 10 is charged, a peak value tends to be gradually decreased. On the other hand, in the current continuous mode, as the input capacitor 10 is charged, the peak value is increased until certain time, but is then decreased and when the input capacitor 10 is completely charged, the peak value tends to take on a constant value. In addition, since a state shown in FIGS. 4A and 4B shows an initial state corresponding to an inrush current, all the tendencies as described above are not represented.

The inrush current can be inhibited by repeating the above operation until the completion of charging of the input capacitor 10. At the time of design, each of the parameters described above can be determined by conditions of an operating frequency, a duty ratio, an inductance value, a switching element (maximum rating), a diode (maximum rating), pre-charge time, etc.

Figure 5A:
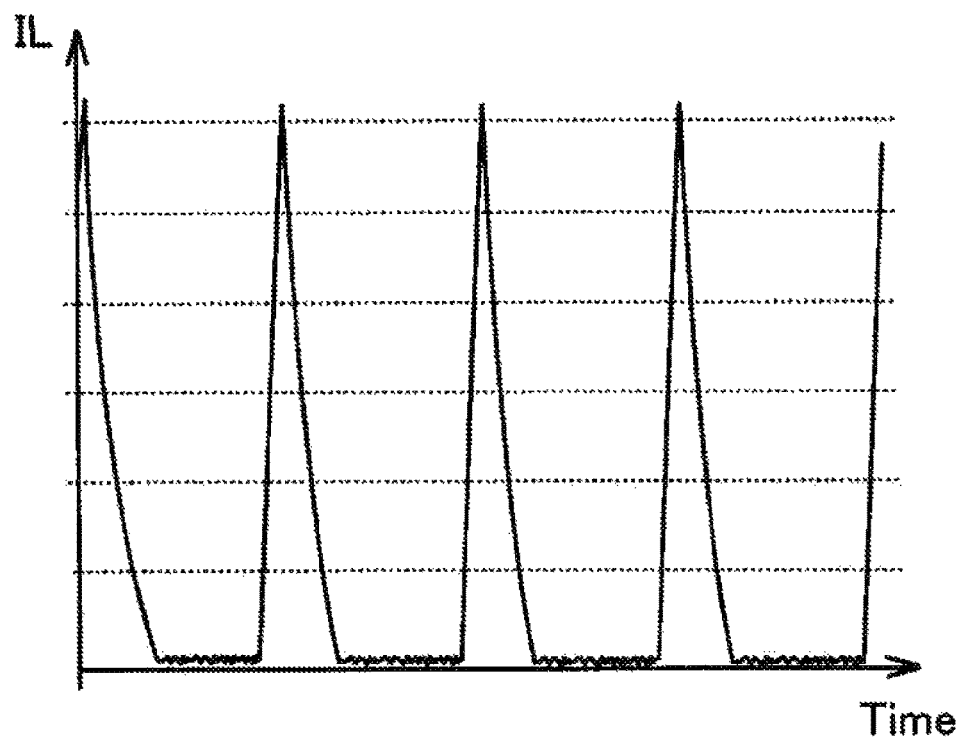
FIGS. 5A and 5B are explanatory diagrams showing experimental results using the inrush current inhibiting circuit.
Figure 5B:
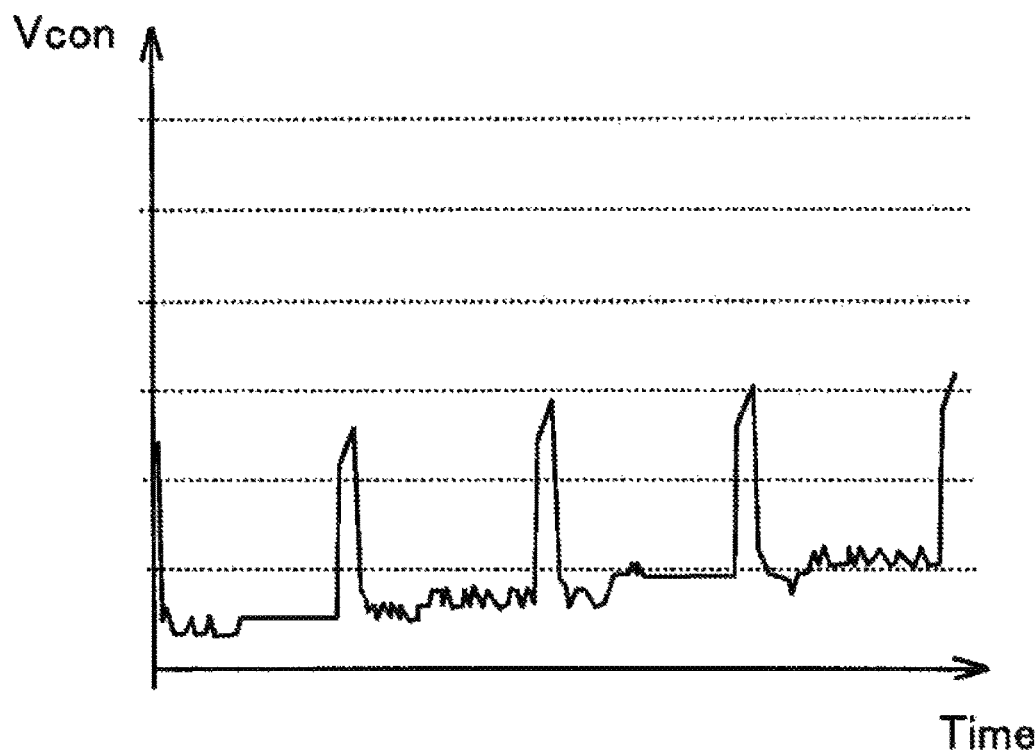

FIGS. 5A and 5B are explanatory diagrams showing experimental results using the inrush current inhibiting circuit 2 in which predetermined parameters are set. FIGS. 5A and 5B are explanatory diagrams showing transition of the inductor current IL and a voltage Vcon across the input capacitor 10. FIGS. 5A and 5B shows a state in which the inrush current (inductor current IL) is inhibited in the current discontinuous mode. In addition, the voltage (an upwardly convex peak-shaped voltage periodically represented in FIGS. 5A and 5B) applied across the input capacitor 10 at the time of turning on the FET 5 is a voltage based on equivalent series resistance of the capacitor.

Figure 6:
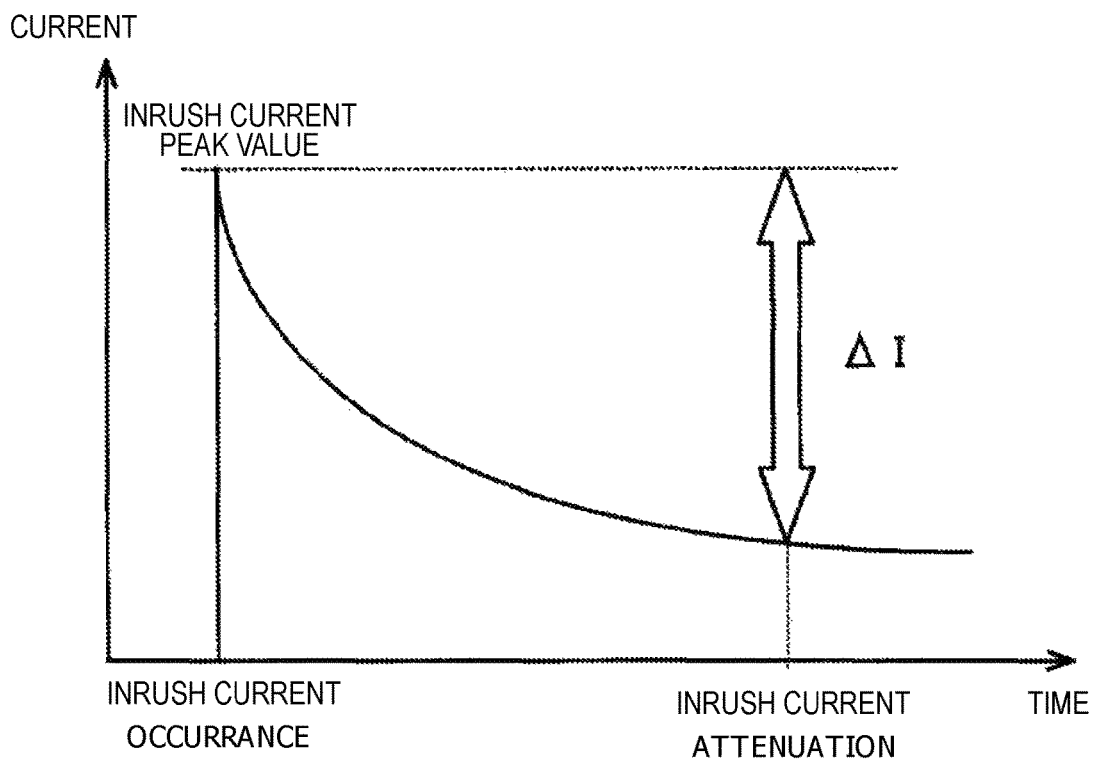
FIG. 6 is an explanatory diagram showing transition of an inrush current.

Incidentally, in the inrush current inhibiting circuit 2 by such operation, a current value of the peak of the inrush current depends on the on time of the FET 5 determined by the duty ratio and the switching frequency of the FET 5. On the other hand, an envelope of the current drawn to the time when the inrush current attenuates has a tendency as shown in FIG. 6. As is evident from FIG. 6, a difference ($\Delta I$) between a current value (current value of the peak) at the time of generating the inrush current and a current value at the time when the inrush current attenuates is caused, and its difference $\Delta I$ becomes larger as the current value at the time of generating the inrush current is larger. Also, electric power applied to the FET 5 is proportional to on resistance (R) of the FET 5 and the square of a current (I) ($RI^2$). That is, in the case of a large current difference $\Delta I$, a large difference between the electric power applied to the FET 5 at the time of generating the inrush current and the electric power applied to the FET 5 at the time when the inrush current attenuates is also caused.

Generally, the element capable of withstanding a maximum value of the current, that is, a peak state of the inrush current is selected as the FET 5. On the other hand, the electric power applied to the FET 5 just before the inrush current attenuates is considerably lower than withstand power of the FET 5. In brief, there is a possibility that withstand power performance (power capacity) of the FET 5 cannot be utilized sufficiently.

Figure 7:
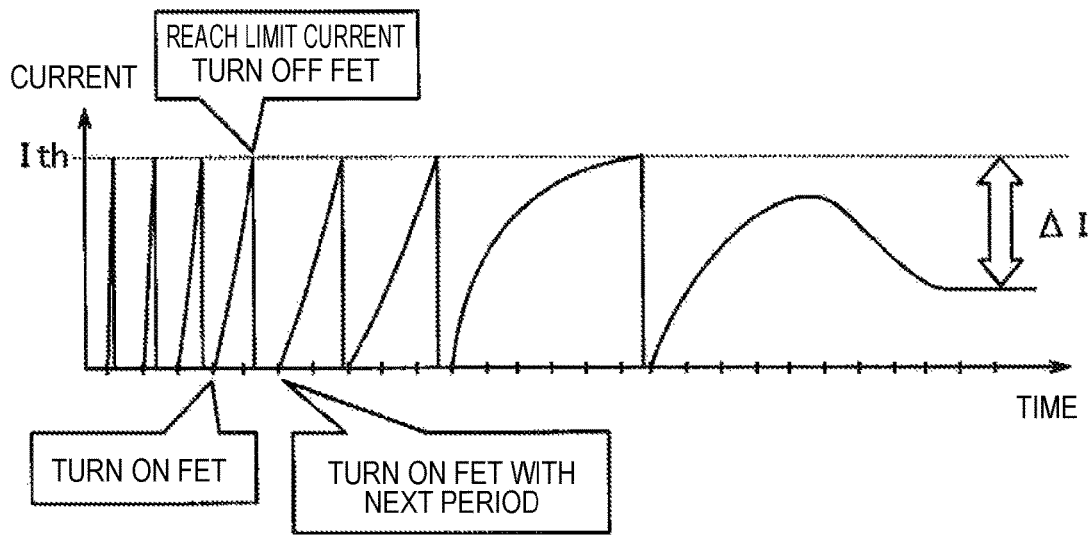
FIG. 7 is an explanatory diagram describing operation of the inrush current inhibiting circuit according to the first embodiment.

Hence, in the embodiment, the inrush current is inhibited properly while sufficiently utilizing the power capacity of the FET 5 by operating the inrush current inhibiting circuit 2 in a control form as described below. Here, FIG. 7 is an explanatory diagram describing operation of the inrush current inhibiting circuit 2 according to the embodiment.

Concretely, the control part 6b performs on-off control of the FET 5 while changing the duty ratio with a predetermined switching period. First, the control part 6b controls the gate driving part 6a, and outputs a gate signal from the gate driving part 6a. Accordingly, a control voltage is applied to a gate of the FET 5, and the FET 5 is turned on. Also, the control part 6b monitors a current (inrush current) detected by the current detecting part 6c, and decides whether or not the detected current reaches a preset limit current Ith. A current value of this limit current Ith is defined in consideration of an upper limit of the withstand power of the FET 5, and the limit current Ith is preset.

When the control part 6b decides that the detected current reaches the limit current Ith, the control part 6b controls the gate driving part 6a, and stops an output of the gate signal from the gate driving part 6a. Accordingly, the control voltage is not applied to the gate of the FET 5, and the FET 5 is turned off. Until the next switching period arrives, the control part 6b maintains a stop of the output of the gate signal and after the switching period arrives, the control part 6b controls the gate driving part 6a, and again outputs the gate signal from the gate driving part 6a. Accordingly, the control voltage is applied to the gate of the FET 5, and the FET 5 is again turned on.

In addition, when the detected current does not reach the limit current Ith until the switching period has elapsed since the FET 5 was turned on, it proceeds to the next switching period with the on state continued, and the decision described above is repeated. The control part 6b repeats such a series of controls until the inrush current attenuates.

In the embodiment thus, the inrush current inhibiting circuit 2 inhibits the inrush current flowing to the load, and this load includes the input capacitor 10 connected to the DC power source 1, and the pair of output terminals 3, 4 which is connected in parallel with the input capacitor 10 and outputs an input current from the DC power source 1. Here, the inrush current inhibiting circuit 2 has the FET 5 connected to the DC power source 1, the FET 5 whose on-off control is performed, the first inductor 8 connected between the FET 5 and a connecting point (connecting point between the one output terminal 3 and one electrode of the input capacitor 10), the reflux diode 9 whose cathode is connected to a connecting point between the FET 5 and the first inductor 8, and the second inductor 8 connected between the anode of the diode and a connecting point (connecting point between the other electrode of the input capacitor 10 and the other output terminal 4). In this case, each of the first and second inductors 8 is constructed of the magnetic substance 20 so as to cover the periphery of the electric wire L which is the current path.

Here, consider that the FET 5 is changed from an off state to an on state in the case of assuming that the inrush current inhibiting circuit 2 has no inductor 8. When a voltage of the DC power source 1 is applied to the inrush current inhibiting circuit, a large current flows in a short time in order to charge the input capacitor 10. This current (inrush current) causes a problem that the FET 5 is destroyed and breaking operation cannot be performed.

In this respect, according to the embodiment, a large current can be inhibited from flowing by forming the inductors 8. Accordingly, the problem that the FET 5 is destroyed and breaking operation cannot be performed can be solved.

Also, according to the embodiment, it is unnecessary to form the inductor 8 by winding an electric wire like a coil by using the magnetic substance 20 as the inductor 8. As a result, upsizing of the circuit by forming the coil using the large-diameter electric wire can be inhibited. Also, since work of winding the electric wire can be omitted, the manufacturing work can be simplified and a manufacturing process or a cost can be reduced.

Further, since common mode noise can be prevented from changing to normal mode noise by decreasing a bias of the circuit by using the inductors 8 with the same inductance values in both of the positive electrode side and the ground side, an adverse influence on the operation can be reduced.

Also, in the embodiment, the control part 6b controls the FET 5 according to a predetermined switching period, and when the FET 5 is turned on, a subsequent current (inrush current) is monitored and when the current reaches the current limit Ith (a preset limit value), the FET 5 is turned off until the next switching period.

According to this configuration, the difference ($\Delta$I) between the peak value of the inrush current and the current value at the time when the inrush current attenuates is inhibited by performing on-off control of the FET 5 so as to limit the current in the range of the current limit Ith as shown in FIG. 7. Accordingly, a large difference can be inhibited from being caused between the electric power applied to the FET 5 at the time of generating the inrush current and the electric power applied to the FET 5 at the time when the inrush current attenuates. Consequently, the power capacity of the FET 5 used in the circuit can be decreased since it is unnecessary to set large withstand power characteristics for the FET 5. As a result, the inrush current can be inhibited properly while effectively utilizing the power capacity of its FET 5. Accordingly, the cost can be reduced and the circuit can be miniaturized since the FET 5 can be replaced with an inexpensive element or the number of parallel components can be decreased.

In other words, the control part 6b controls the FET 5 so as to decrease the difference between the electric power applied to the FET 5 at the time of generating the inrush current and the electric power applied to the FET 5 at the time when the inrush current attenuates.

Second Embodiment

Figure 8:
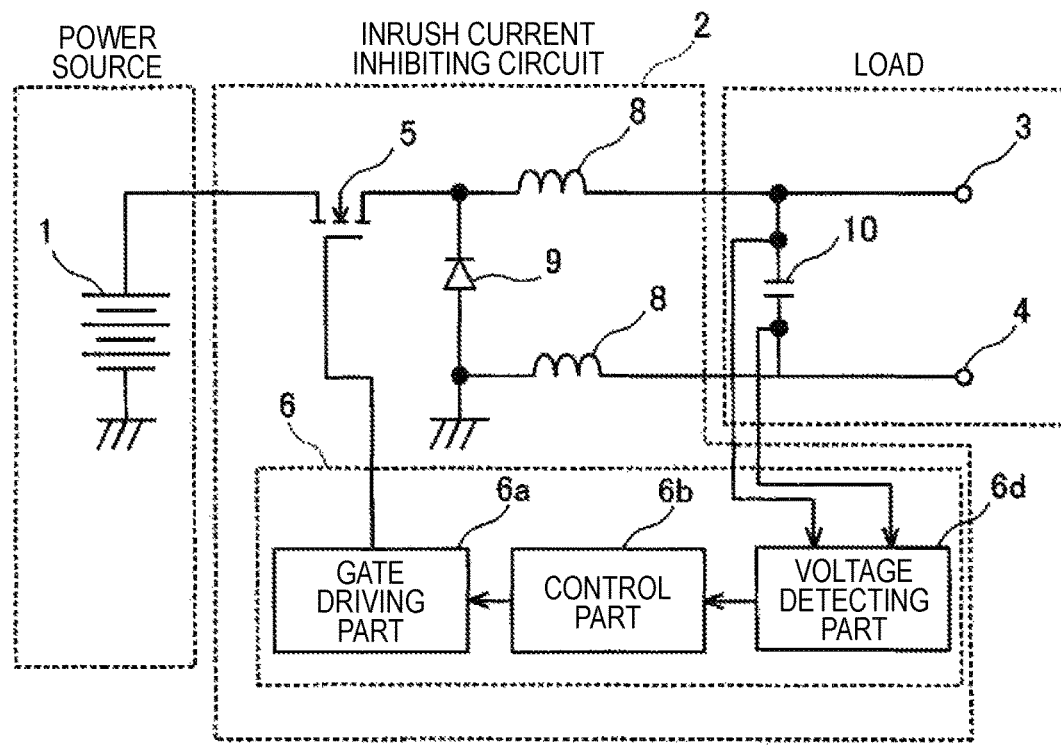
FIG. 8 is a circuit diagram showing a configuration of an inrush current inhibiting circuit according to a second embodiment.

FIG. 8 is a circuit diagram showing a configuration of an inrush current inhibiting circuit 2 according to the present embodiment. The inrush current inhibiting circuit 2 according to a second embodiment differs from that of the first embodiment in a configuration of a control unit 6 and its control form. Hereinafter, description of the contents common to those of the first embodiment will be omitted and a point of difference will be mainly described.

The control unit 6 is a unit for controlling the inrush current inhibiting circuit 2 like the first embodiment, and includes a gate driving part 6a, a control part 6b, and a voltage detecting part 6d. The gate driving part 6a is controlled by the control part 6b, and outputs a gate signal to a gate of an FET 5. A predetermined control voltage is applied to the gate of the FET 5 by the gate signal from the gate driving part 6a. The control part 6b controls the gate driving part 6a based on a voltage (detected voltage) detected by the voltage detecting part 6d and a voltage of a carrier varying periodically, for example, a triangular wave. The voltage detecting part 6d is means for detecting a voltage across an input capacitor 10 of a load.

Figure 9:
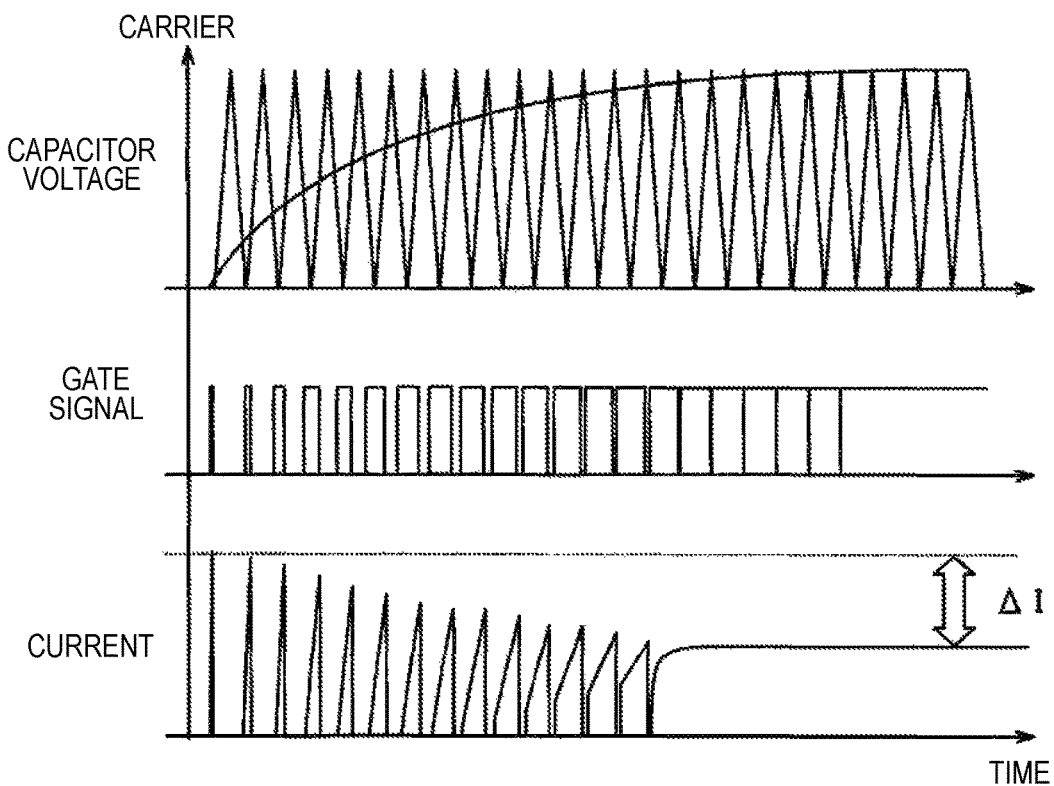
FIG. 9 is an explanatory diagram describing operation of the inrush current inhibiting circuit according to the second embodiment.

Next, concrete operation of the inrush current inhibiting circuit 2 according to the embodiment will be described. The control part 6b performs on-off control of the FET 5 while changing the duty ratio with a predetermined switching period. Here, FIG. 9 is an explanatory diagram describing operation of the inrush current inhibiting circuit 2 according to the second embodiment. FIG. 9 includes a carrier wave, capacitor wave, gate signal wave, and current wave.

Concretely, the control part 6b performs on-off control of the FET 5 by PWM control, and compares the detected voltage detected by the voltage detecting part 6d with the voltage of the carrier which is the triangular wave as shown in the wave of the capacitor voltage of FIG. 9. When the detected voltage is higher than the voltage of the carrier, the control part 6b controls the gate driving part 6a and outputs a gate signal, and on the other hand, when the detected voltage is lower than or equal to the voltage of the carrier, the control part 6b controls the gate driving part 6a and stops an output of the gate signal. When the gate signal is outputted from the gate driving part 6a, a control voltage is applied to the gate of the FET 5, with the result that the FET 5 is turned on. On the other hand, when the output of the gate signal from the gate driving part 6a is stopped, the control voltage is not applied to the gate of the FET 5, and the FET 5 is turned off. Then, the control part 6b repeats such a series of controls until the inrush current attenuates.

According to the present embodiment thus, a difference ($\Delta$I) between a peak value of an inrush current and a current value at the time when the inrush current attenuates can be inhibited by performing the PWM control according to the voltage of the input capacitor 10 as shown in the wave of the current of FIG. 9. Accordingly, a large difference can be inhibited from being caused between electric power applied to the FET 5 at the time of generating the inrush current and electric power applied to the FET 5 at the time when the inrush current attenuates. Consequently, a power capacity of the FET 5 used in the circuit can be decreased since it is unnecessary to set large withstand power characteristics for the FET 5. As a result, the inrush current can be inhibited properly while effectively utilizing the power capacity of its FET 5. Accordingly, the cost can be reduced and the circuit can be miniaturized since the FET 5 can be replaced with an inexpensive element or the number of parallel components can be decreased.

In addition, in each of the embodiments described above, when the magnetic substance 20 is used as the inductor 8, there are many factors to be considered, for example, a BH curve of the magnetic substance, frequency characteristics, dimensions (a, h), a value of a current flowing through an electric wire, or an operating frequency. Also, since the current value is not constant or the magnetic substances vary, it is difficult to uniformly determine a magnetic field in the magnetic substance at the time of design. Hence, preferably, the magnetic substance 20 is constructed by being divided into rings along an axial direction and the axial length h is set variably by selecting the number of divided annular components. Accordingly, an error at the time of design can be accommodated since the axial length h can easily be changed at the time of manufacture.

The inrush current inhibiting circuits according to the embodiments have been described above, but the invention is not limited to the embodiments, and various changes can be made within the scope of the invention. For example, the "power source" may be not only a power source for outputting a DC current as it is, such as a primary battery or a secondary battery, but also a power source for rectifying an output of an AC power source by a rectifier and outputting a DC current, or the AC power source itself. Also, in the embodiments, the inductance values of the first and second inductors are set at the same value, but an exact match between the inductance values is not required and there may be a difference between the inductance values as long as each of the inductors performs an equivalent function.

Herein the features of the inrush current inhibiting circuit according to the embodiments will be briefly summarized and listed below.

[1] An inrush current inhibiting circuit for inhibiting an inrush current flowing to a load which includes an input capacitor and a pair of output terminals, the inrush current inhibiting circuit is provided with:

a switching element connected to a power source and on-off controlled;

a first inductor connected between the switching element and a connecting point between the one output terminal and one electrode of the input capacitor;

a diode whose cathode is connected to a connecting point between the switching element and the first inductor;

a second inductor connected between an anode of the diode and a connecting point between the other electrode of the input capacitor and the other output terminal; and a control part for controlling the switching element, wherein the input capacitor is connected to the power source through the inrush current inhibiting circuit, wherein the pair of output terminals is connected in parallel with the input capacitor and outputs an input current from the power source, wherein each of the first inductor and the second inductor is supplied with an annular magnetic substance having a predetermined length along an axial direction so as to cover a periphery of an electric wire which is a current path, and wherein the control part controls the switching element so as to decrease a difference between electric power applied to the switching element when the inrush current occurs and electric power applied to the switching element when the inrush current attenuates.

[2] The inrush current inhibiting circuit according to [1], wherein the control part controls the switching element according to a predetermined switching period, wherein a subsequent current is monitored when the switching element is turned on and the switching element is turned off until the next switching period when an amount of the current reaches a predetermined limited value.

[3] The inrush current inhibiting circuit according to [1], wherein the control part performs on-off control of the switching element by comparing a voltage of a carrier varying periodically with an end-to-end voltage of the input capacitor.

According to [1] to [3], a large difference can be inhibited from being caused between the electric power applied to the switching element when the inrush current occurs and the electric power applied to the switching element when the inrush current attenuates. As a result, the inrush current can be inhibited properly while effectively utilizing a power capacity of the switching element.

DESCRIPTION OF REFERENCE NUMERALS AND SIGNS

1 DC POWER SOURCE
2 INRUSH CURRENT INHIBITING CIRCUIT
3 OUTPUT TERMINAL
4 OUTPUT TERMINAL
5 FET
6 CONTROL UNIT
6a GATE DRIVING PART
6b CONTROL PART
6c CURRENT DETECTING PART
6d VOLTAGE DETECTING PART
8 INDUCTOR
9 DIODE
10 CAPACITOR
20 MAGNETIC SUBSTANCE

What is claimed is:

1. An inrush current inhibiting circuit for inhibiting an inrush current flowing to a load which includes an input capacitor and a pair of output terminals, the inrush current inhibiting circuit comprising:

a switching element connected to a power source and configured to turn on-off the power source;

a first inductor connected between the switching element and a connecting point between one of the output terminals and one of electrodes of the input capacitor;

a diode whose cathode is connected to a connecting point between the switching element and the first inductor;

a second inductor connected between an anode of the diode and a connecting point between another one of the output terminals and another one of electrodes of the input capacitor; and a control part that controls the switching element, wherein the control part controls the switching element according to a predetermined switching period, monitors a subsequence current when the switching element is turned on, and turns off the switching element until a next switching period, wherein the control part controls the switching element so as to decrease a difference between an electric power applied to the switching element when the inrush current occurs and an electric power applied to the switching element when the inrush current attenuates, wherein the control part performs on-off control of the switching element by comparing a voltage of a carrier varying periodically with an end-to-end voltage of the input capacitor, and wherein inductance values of the first and second inductors are set to be the same value.

2. The inrush current inhibiting circuit according to claim 1, wherein the switching element is turned off until the next switching period when an amount of the current reaches a predetermined limited value.

* * * * *